United States Patent
Lavallee et al.

(10) Patent No.: US 11,021,244 B2
(45) Date of Patent: Jun. 1, 2021

(54) COLLECTIVE CONTROL STICK MOUNTED THROTTLE CONTROL ASSEMBLY

(71) Applicant: Bell Helicopter Textron Inc., Fort Worth, TX (US)

(72) Inventors: Yann Lavallee, St-Hippolyte (CA); Carey Cannon, Colleyville, TX (US)

(73) Assignee: Textron Innovations Inc., Providence, RI (US)

(*) Notice: Subject to any disclaimer, the term of this patent is extended or adjusted under 35 U.S.C. 154(b) by 219 days.

(21) Appl. No.: 15/913,526

(22) Filed: Mar. 6, 2018

(65) Prior Publication Data

US 2018/0251214 A1    Sep. 6, 2018

Related U.S. Application Data (60) Provisional application No. 62/467,797, filed on Mar. 6, 2017.

(51) Int. Cl.
*B64C 27/56* (2006.01)
*B64D 31/04* (2006.01)

(52) U.S. Cl.
CPC .............. *B64C 27/56* (2013.01); *B64D 31/04* (2013.01)

(58) Field of Classification Search
CPC ..... B64C 13/0421; B64C 13/12; B64C 27/56; B64D 31/04
See application file for complete search history.

(56) References Cited

U.S. PATENT DOCUMENTS

| | | | |
|---|---|---|---|
| 4,130,259 A * | 12/1978 | Carlson | B64C 27/56 244/234 |
| 5,403,155 A | 4/1995 | Head et al. | |
| 5,472,156 A | 12/1995 | Bivens, III et al. | |
| 6,000,662 A * | 12/1999 | Todeschi | B64C 13/12 244/223 |
| 8,078,340 B2 * | 12/2011 | Johnson | B64C 13/503 701/3 |
| 8,352,098 B2 * | 1/2013 | Sataka | B64C 13/12 701/3 |
| 10,035,583 B2 * | 7/2018 | Scofield | B64C 13/0421 |
| 10,338,628 B2 * | 7/2019 | Snyder | G05G 1/04 |
| 2013/0211631 A1 | 8/2013 | Yates et al. | |
| 2017/0113783 A1* | 4/2017 | Scofield | G05G 9/047 |
| 2017/0225776 A1* | 8/2017 | Cyr | B64C 11/301 |

(Continued)

FOREIGN PATENT DOCUMENTS

EP    3159261 A1    4/2017

OTHER PUBLICATIONS

Canadian Exam Report in related Canadian Patent Application No. 2,997,569 dated Apr. 9, 2019, 4 pages.

(Continued)

*Primary Examiner* — Joseph W Sanderson
(74) *Attorney, Agent, or Firm* — Lightfoot & Alford PLLC (57) ABSTRACT

A helicopter includes a full authority digital engine controlled (FADEC) engine, a first two-position throttle switch disposed on a first collective control stick, the first two-position throttle switch being movable between a Fly position and an Idle position, and a second two-position throttle switch disposed on a second collective control stick, the second two-position throttle switch being movable between a Fly position and an Idle position.

15 Claims, 6 Drawing Sheets

(56) References Cited

U.S. PATENT DOCUMENTS

2018/0067514 A1* 3/2018 Snyder .................... G05G 5/04
2018/0251210 A1* 9/2018 Adams ................ B64C 13/0421

OTHER PUBLICATIONS

European Exam Report in related European Patent Application No. 18160353.1 dated Mar. 26, 2019, 5 pages.
European Search Report in related European Patent Application No. 18160353.1 dated Aug. 31, 2018, 4 pages.
European Exam Report in related European Patent Application No. 18160353.1 dated Sep. 17, 2018, 4 pages.

* cited by examiner

| PILOT 1 SWITCH POSITION | PILOT 2 SWITCH POSITION | RESULT |
| --- | --- | --- |
| IDLE | IDLE | FADEC COMMANDS ENGINE TO OPERATE IN IDLE REGIME |
| FLY | IDLE | FADEC COMMANDS ENGINE TO OPERATE IN FLY REGIME; SWITCHING PILOT 1 SWITCH TO IDLE CAN RESULT IN AUTOROTATION |
| IDLE | FLY | FADEC COMMANDS ENGINE TO OPERATE IN FLY REGIME; SWITCHING PILOT 2 SWITCH TO IDLE CAN RESULT IN AUTOROTATION |
| FLY | FLY | FADEC COMMANDS ENGINE TO OPERATE IN FLY REGIME; A DUAL FLY CREW ALERTING SYSTEM CAUTION MESSAGE IS ILLUMINATED TO INDICATE THAT THE SWITCHING TO IDLE REGIME OPERATION OF THE ENGINE WILL REQUIRE BOTH THE PILOT 1 SWITCH POSITION TO BE CHANGED TO IDLE AND THE PILOT 2 SWITCH POSITION TO BE CHANGED TO IDLE |

FIG. 6

COLLECTIVE CONTROL STICK MOUNTED THROTTLE CONTROL ASSEMBLY

CROSS-REFERENCE TO RELATED APPLICATIONS

This application claims priority under 35 U.S.C. § 119(e) to U.S. Provisional Patent Application No. 62/467,797 filed on 6 Mar. 2017 by Yann Lavallee, et al., titled "COLLECTIVE CONTROL STICK MOUNTED THROTTLE CONTROL ASSEMBLY," the disclosure of which is hereby incorporated by reference in its entirety.

BACKGROUND

Some helicopters include collective control sticks comprising a continuously variable throttle control. In some cases, the throttle control comprises a twist grip assembly disposed near an end of the collective control stick. In some embodiments where a helicopter is configured to allow more than one pilot, the helicopter sometimes comprises two collective control sticks, one for each pilot. In cases where there are two collective control sticks, the twist grip assemblies of the collective control sticks are mechanically interconnected so that movement of one twist grip assembly results in substantially similar movement of the other twist grip assembly. However, the twist grip assembly and the mechanical interconnections between the multiple twist grip assemblies are expensive to manufacture and account for additional weight that the helicopter must carry, thereby reducing an overall efficiency and/or payload capacity of the helicopter.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
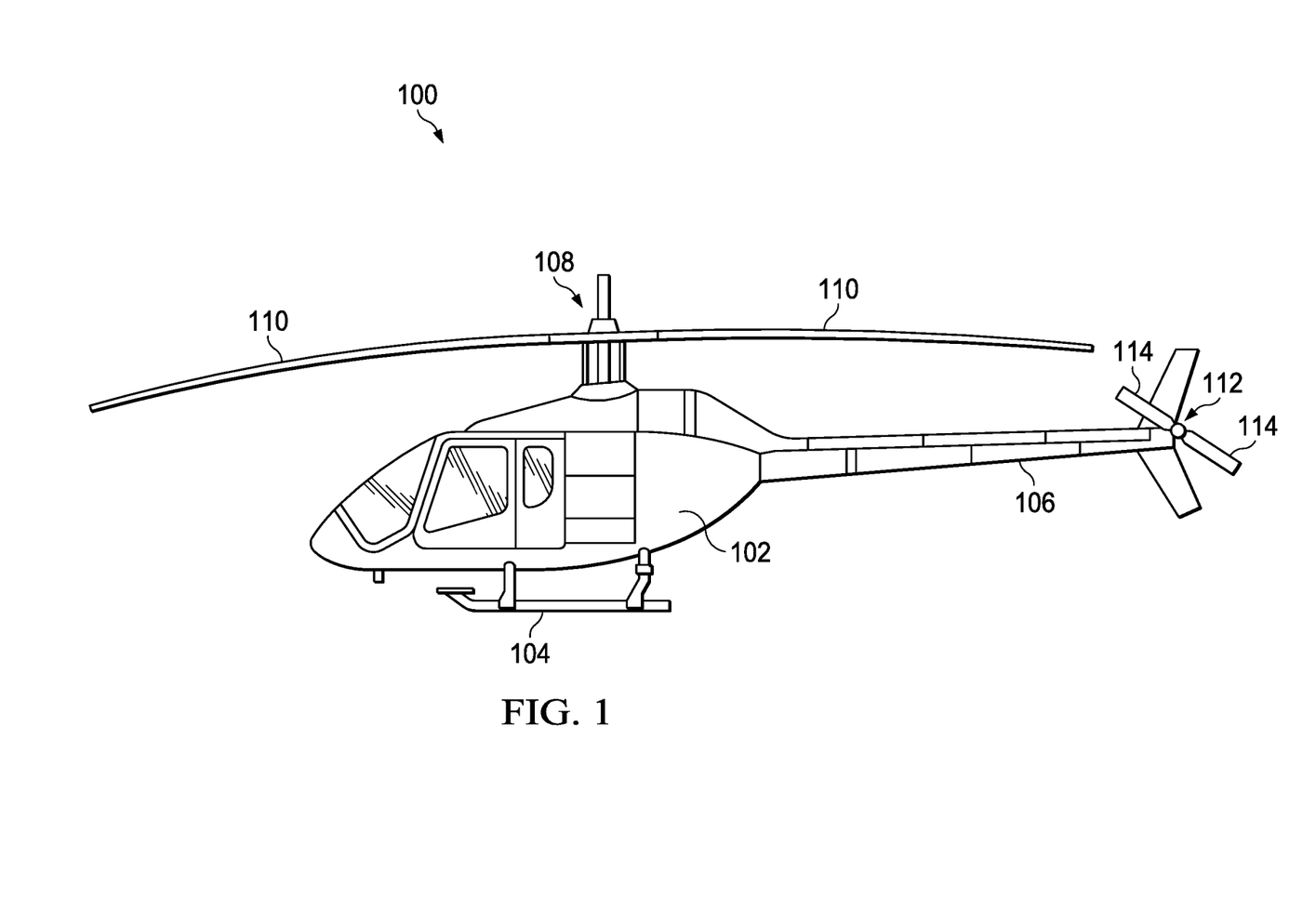
FIG. 1 is an orthogonal left side view of a helicopter according to an embodiment of this disclosure.
Figure 2:
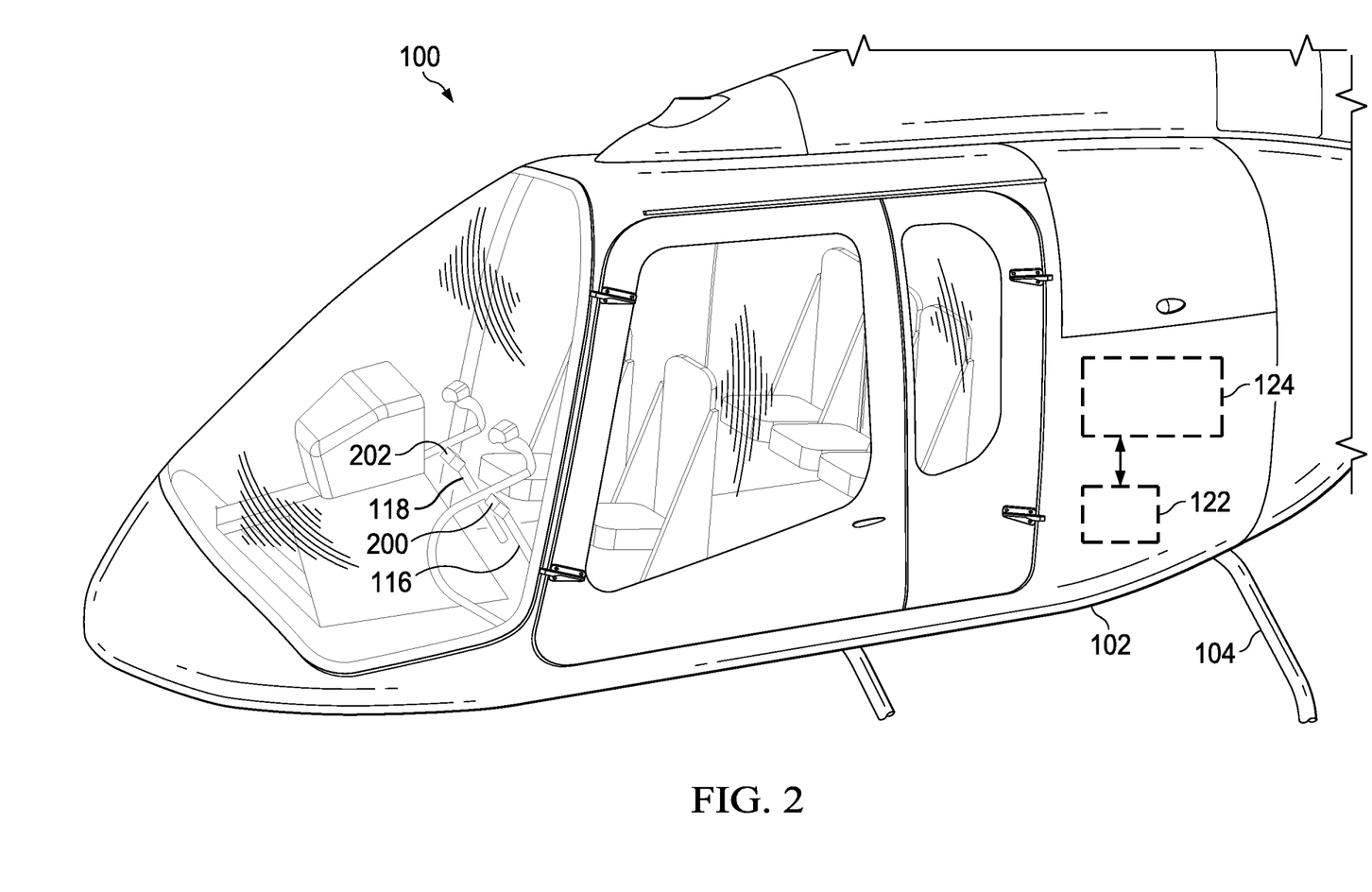
FIG. 2 is a partial oblique left side view of the helicopter of FIG. 1 showing a cockpit of the helicopter of FIG. 1 in greater detail.

Referring to FIGS. 1-2 in the drawings, a helicopter 100 is illustrated. Helicopter 100 can include a fuselage 102, a landing gear 104, a tail member 106, a main rotor system 108 comprising main rotor blades 110, and a tail rotor system 112 comprising tail rotor blades 114. The main rotor blades 110 and the tail rotor blades 114 can be rotated and selectively controlled to selectively control direction, thrust, and lift of helicopter 100.

Referring now to FIG. 2, the helicopter 100 further comprises a first collective control stick (CCS) 116 that carries a first throttle control assembly (TCA) 200 and a second CCS 118 that carries a second TCA 202. Most generally, the CCSs 116, 118 are configured to control pitch angle of all the main rotor blades 110 collectively, thereby controlling a total lift derived from the main rotor system 108. The TCA 202 is substantially similar to the TCA 200 and generally comprises substantially the same components.

Figure 3:
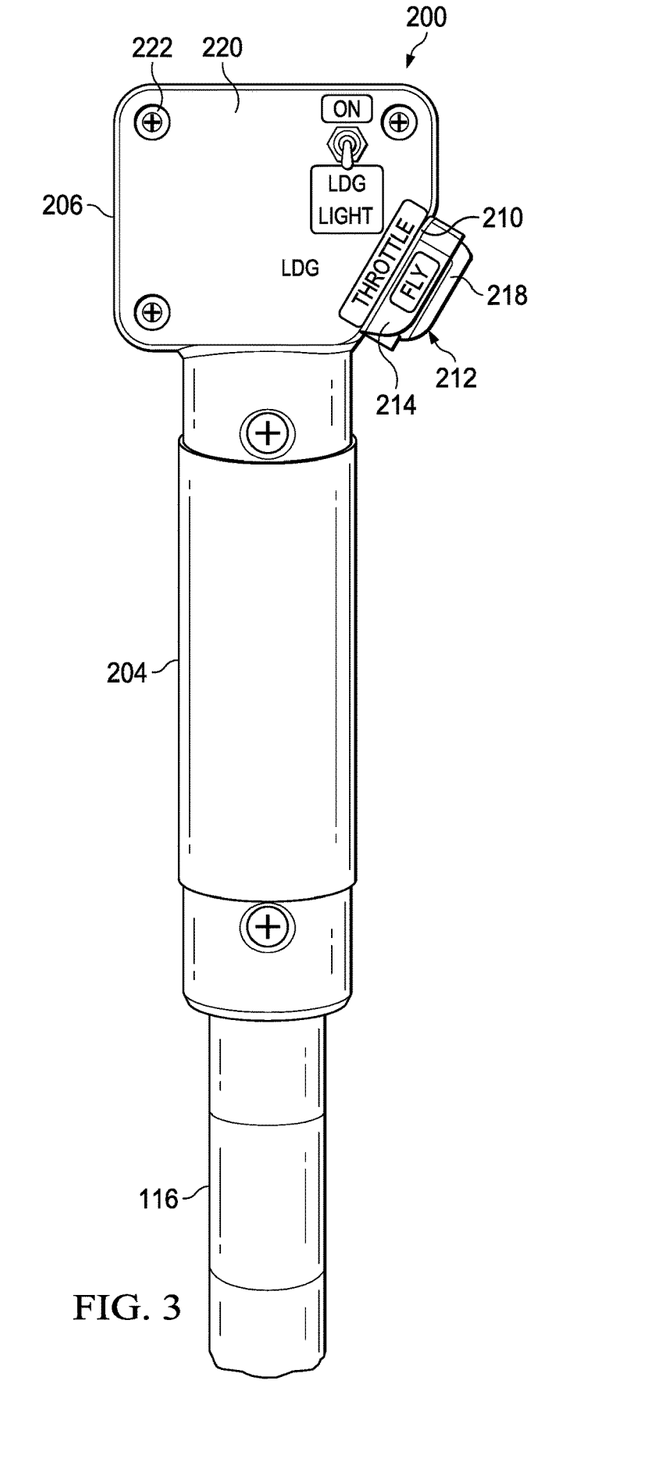
FIG. 3 is an orthogonal rear view of a collective control stick mounted throttle control assembly.
Figure 4:
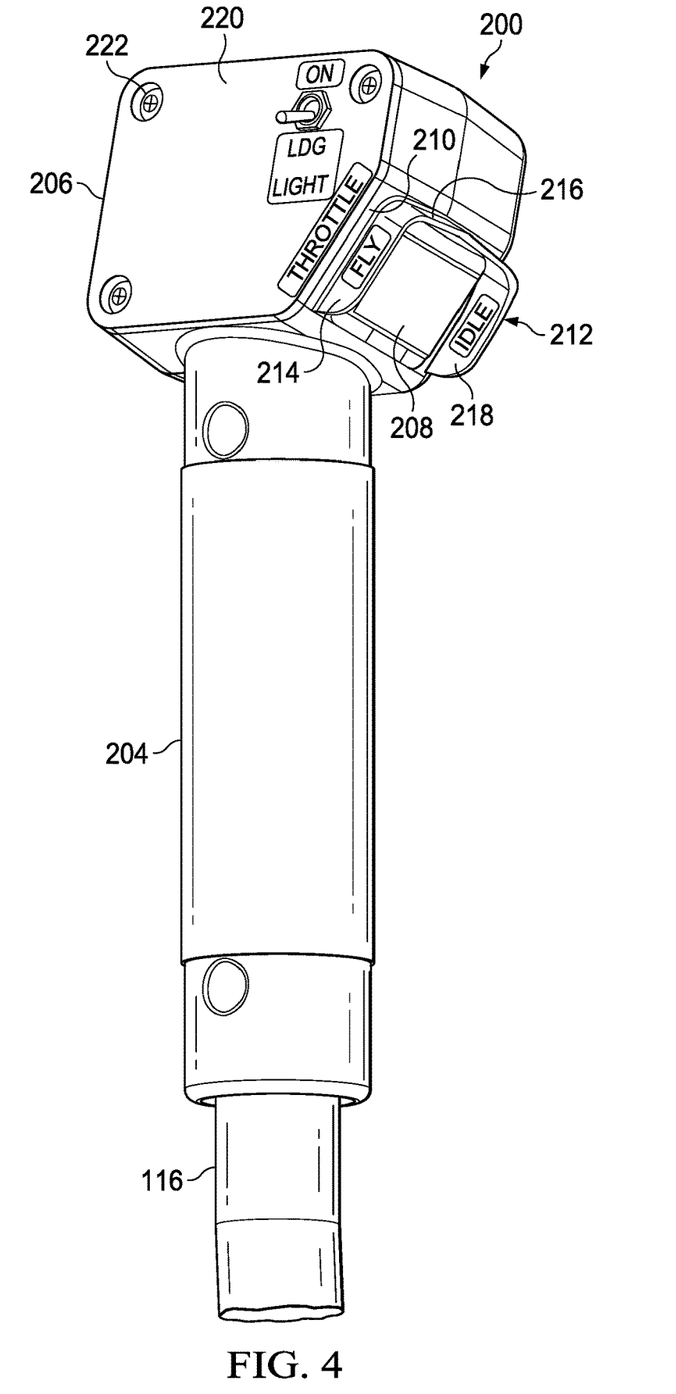
FIG. 4 is an oblique view of the collective control stick mounted throttle control assembly.
Figure 5:
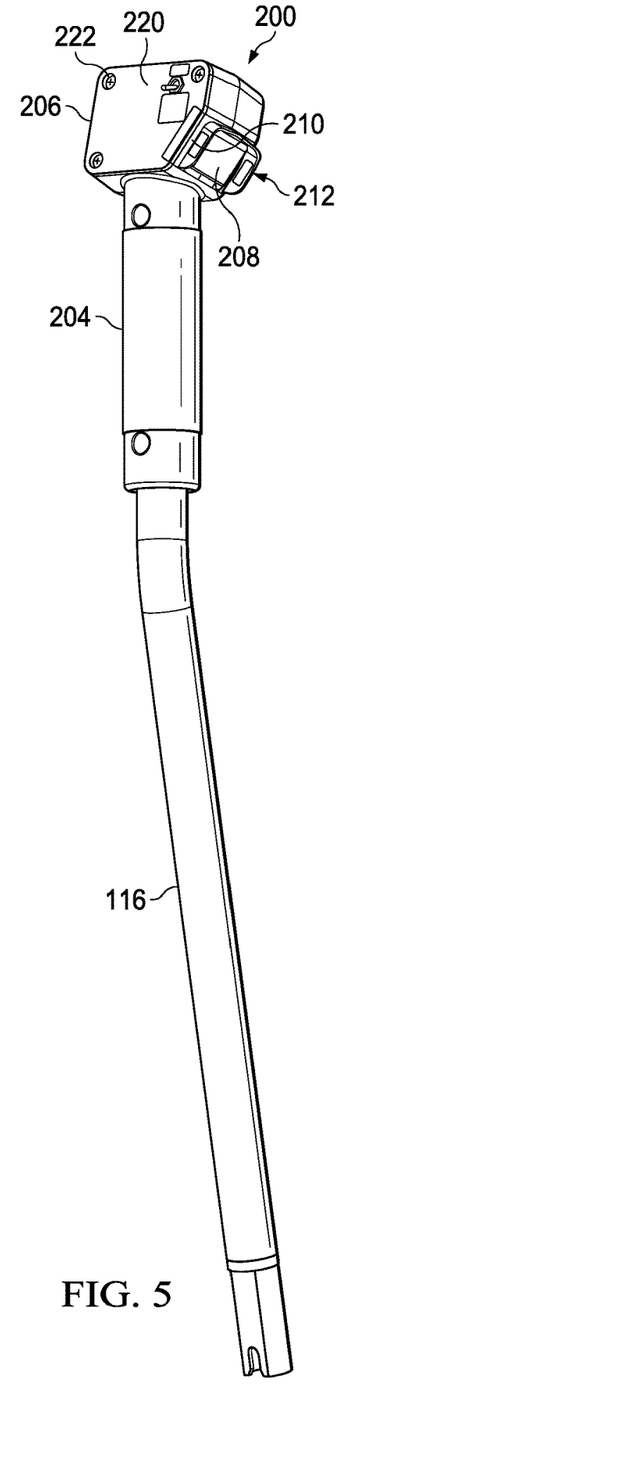
FIG. 5 is another oblique view of the collective control stick mounted throttle control assembly.

Referring now to FIGS. 3-5, a CCS 116 carrying a TCA 200 is shown. TCA 200 generally comprises a handle 204 connected to CCS 116 and a head 206 connected to a distal end of the handle 204. In some embodiments, twisting a grip portion of the handle 204 can control an engine throttle. The handle 204 is generally sized and shaped to receive a portion of the CCS 116 generally coaxially within the handle 204. The head 206 is generally shaped as a boxlike structure configured to carry a two-position throttle switch 208. As viewed from behind (see FIG. 3), the head 206 is substantially rectangular with the exception of a chamfer 210 between the right side and bottom side of the rectangular shape. The head 206 further comprises a switch shield 212 comprising a rear wall 214, an upper wall 216, and a forward wall 218. In this embodiment, the rear wall 214 is connected to the upper wall 216 and the upper wall 216 is connected to the forward wall 218.

In this embodiment, the switch shield 212 comprises no wall joining a lower portion of the rear wall 214 to a lower portion of the forward wall 218. Instead of comprising a wall joining the lower portion of the rear wall 214 to a lower portion of the forward wall 218, the space between the lower portion of the rear wall 214 and the lower portion of the forward wall 218 is unoccupied by the switch shield 212 so that a pilot can manipulate the throttle switch 208 with a thumb while still grasping the handle 204 with fingers. In this embodiment, the head 206 further comprises a removable panel 220 that is fastened to the remainder of the head 206 using fasteners 222. In some cases, the removable panel 220 can be removed from the remainder of the head 206 to allow access to the interior of the boxlike structure of the head 206. Accordingly, installation and/or removal of the throttle switch 208 can be accomplished by inserting the throttle switch 208 into the interior of the boxlike structure and thereafter securing the throttle switch 208 relative to the head 206 and the switch shield 212. The throttle switch 208 is electrically connected to a full authority digital engine (or electronics) control (FADEC) 122 that is configured to selectively control operation of an engine 124.

In this embodiment, each of the TCA 200 and 202 comprises a throttle switch 208. For the purpose of discussion, the throttle switch 208 of TCA 200 can be referred to as a Pilot 1 Switch and the throttle switch 208 of TCA 202 can be referred to as a Pilot 2 Switch. In operation, startup of the helicopter 100 can begin with each of the Pilot 1 Switch and the Pilot 2 Switch being set to a so-called Idle position. When both the Pilot 1 Switch and the Pilot 2 Switch are in the Idle position, the FADEC 122 commands the engine 124 to operate in an Idle regime. However, when at least one of the Pilot 1 Switch and the Pilot 2 Switch are set to a so-called Fly position, the FADEC 122 commands the engine 124 to operate in a Fly regime. In some embodiments, operating the engine 124 in the Fly regime causes the engine 124 to safely accelerate to a full power level or 100% power condition. In some embodiments, operating the engine 124 in the Idle regime causes the engine 124 to safely decelerate or otherwise approach an idle power level that is insufficient for supporting flight. Because the throttle switches 208 only offer two positions, Idle position and Fly position, the FADEC 122 is provided with unambiguous engine regime selection inputs.

Unlike conventional helicopters, the helicopter 100 comprises a single engine 124, multiple pilot control channels (one for each of the TCA 200 and TCA 202), and a FADEC 122 (configured to receive control inputs from the TCA 200 and TCA 202). In alternative embodiments, more than two pilot control channels could be provided (requiring additional TCAs). Also, in alternative embodiments, multiple engines can be provided and controlled in a manner like that described above with regard to the single engine 124. In some embodiments, when any throttle switch 208 is in the Fly position, the engine 124 is commanded by the FADEC 122 to operate at 100% or some other preset speed or power.

In some cases, the embodiments disclosed herein can provide an enhancement to traditional helicopter flight training. For example, because the handles 204 are stationary relative to the CCSs 116 and are not mechanically linked, the toggling of a Pilot 1 Switch by a first pilot (such as a flight instructor) is not necessarily perceived by a second pilot (such as a flight student). In some cases, a flight instructor operating Pilot 1 Switch can instruct a student to switch Pilot 2 Switch to Idle position so that the flight instructor is in control of which regime the engine 124 operates. In some cases, the flight instructor can switch Pilot 1 Switch to Idle position while the fight student's Pilot 2 Switch is already in Idle position. The result of both the Pilot 1 Switch and the Pilot 2 Switch being in Idle positions while the helicopter 100 is in flight is that the helicopter 100 will begin autorotation. Accordingly, the student pilot can toggle Pilot 2 Switch to Fly position when appropriate as a training exercise in how to recover from loss of power and/or how to recover from autorotation. In this embodiment, if either of the throttle switches 208 fail and/or electrical connectivity between the throttle switches 208 and the FADEC 122 is compromised, the default engine 124 operation is to operate in the Fly Regime.

In this embodiment, the throttle switches 208 are configured as rocker switches. When a forward portion of the throttle switches 208 is pressed toward the interior of the head 206, the throttle switch 208 can be forced into the Idle position. Similarly, when a rear portion of the throttle switches 208 is pressed toward the interior of the head 206, the throttle switch 208 can be forced into the Fly position. In some cases, the directionality of the toggling of the switches is complementary to a direction of twist utilized in conventional twist-grip throttle controls on collective sticks. In alternative embodiments, a conventional continuously variable twist-grip throttle control can be converted to a two-position switch system in which a twisting motion of a handle can provide substantially similar switching activity between a Fly position and an Idle position.

In some embodiments, two throttle switches 208 can be connected in series so that both must be in the Idle position to give the Idle command to the FADEC 122. However, when the throttle switches 208 are both in the Fly position, a parallel circuit can activate a signal in avionics to illuminate a Dual Fly caution message.

Figure 6:
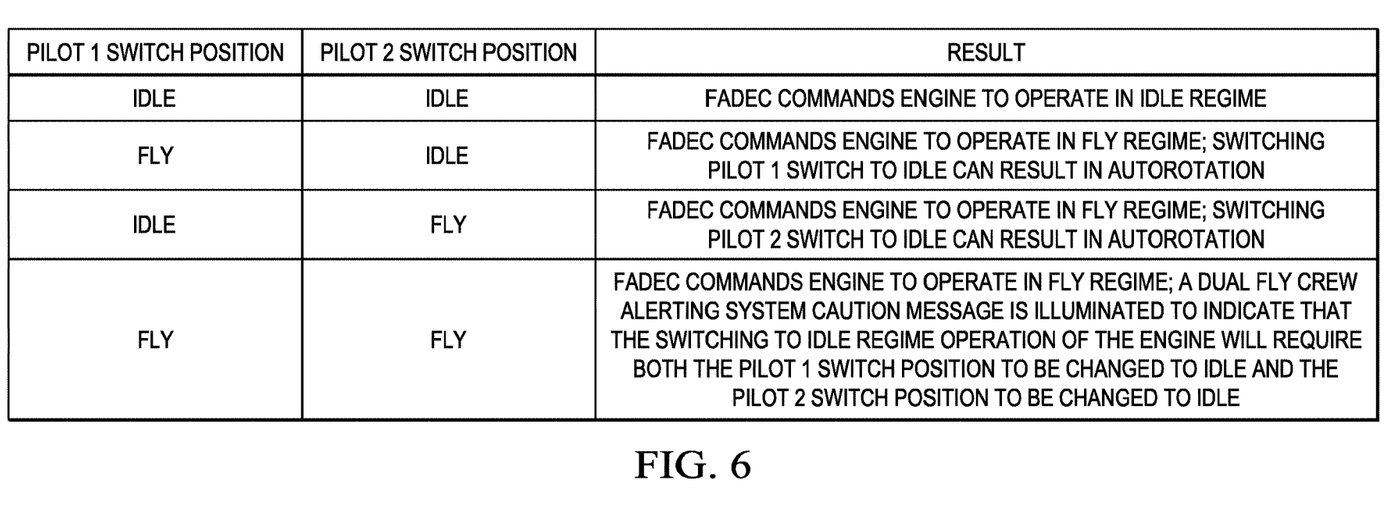
FIG. 6 is a table of switch positions and resultant helicopter actions.

Referring now to FIG. 6, a table of Pilot 1 Switch and Pilot 2 Switch positions and related resultant helicopter actions is provided. As shown in FIG. 6, when the Pilot 1 Switch is in the Idle position and the Pilot 2 Switch is in the Idle position, the FADEC 122 can command the engine 124 to operate in an Idle regime. When the Pilot 1 Switch is in the Fly position and the Pilot 2 Switch is in the Idle position, the FADEC 122 can command the engine 124 to operate in a Fly regime and entering autorotation can be achieved by switching the Pilot 1 Switch to the Idle position. When the Pilot 1 Switch is in the Idle position and the Pilot 2 Switch is in the Fly position, the FADEC 122 can command the engine 124 to operate in a Fly regime and entering autorotation can be achieved by switching the Pilot 2 Switch to the Idle position. When the Pilot 1 Switch is in the Fly position and the Pilot 2 Switch is in the Fly position, the FADEC 122 can command the engine 124 to operate in a Fly regime, and a Dual Fly crew alerting system caution message can be illuminated to indicate that switching to the Idle regime of operation of the engine 124 will require both the Pilot 1 Switch and the Pilot 2 Switch both be changed to the their Idle positions.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:
1. A helicopter, comprising:
   at least one full authority digital engine controlled (FADEC) engine;
   a FADEC device configured to control the FADEC engine;

a first two-position throttle switch disposed on a first collective control stick, the first two-position throttle switch being movable between a Fly position and an Idle position; and a second two-position throttle switch disposed on a second collective control stick, the second two-position throttle switch being movable between a Fly position and an Idle position wherein when the first two-position throttle switch is set to the Fly position and the second two-position throttle switch is set to the Fly position, the FADEC device commands the engine to operate in a Fly regime; and wherein at least one of (1) when the first two-position switch is in the Fly position and the second two-position switch is in the Idle position, the FADEC device commands the engine to operate in a fly regime and subsequent switching the first two-position switch to the Idle position initiates autorotation of the helicopter and (2) when the first two-position switch is in the Idle position and the second two-position switch is in the Fly position, the FADEC device commands the engine to operate in a fly regime and subsequent switching the second two-position switch to the Idle position initiates autorotation of the helicopter.

2. The helicopter of claim 1, wherein at least one of the first collective control stick and the second collective control stick is movable to control a pitch angle of a rotor blade.

3. The helicopter of claim 1, wherein at least one of the first two-position throttle switch and the second two-position throttle switch comprises a rocker switch.

4. The helicopter of claim 1, wherein the first collective control stick comprises a head disposed at a distal end of the first collective control stick.

5. The helicopter of claim 4, wherein the first collective control stick comprises a twistable grip portion configured to throttle the engine.

6. The helicopter of claim 5, wherein the first two-position throttle switch is disposed on the head and in oriented to face at least partially laterally.

7. The helicopter of claim 4, the head further comprising:
a switch shield protruding from the head.

8. The helicopter of claim 7, wherein the switch shield comprises a rear wall.

9. The helicopter of claim 7, wherein the switch shield comprises a forward wall.

10. The helicopter of claim 7, wherein the switch shield comprises an upper wall.

11. The helicopter of claim 1, wherein when the first two-position switch is in the Idle position and the second two-position switch is in the Idle position, the FADEC device commands the engine to operate in an idle regime.

12. The helicopter of claim 1, wherein when the first two-position switch is in the Fly position and the second two-position switch is in the Fly position, the FADEC device commands the engine to operate in a fly regime and a dual fly crew alerting system caution message is provided to indicate that autorotation can be accomplished by switching both the first two-position switch and the second two-position switch to their Idle positions.

13. A method of controlling a helicopter, comprising:
providing at least one full authority digital engine controlled (FADEC) engine;
providing a FADEC device configured to control the engine;
providing a first two-position throttle switch disposed on a first collective control stick, the first two-position throttle switch being movable between a Fly position and an Idle position;
providing a second two-position throttle switch disposed on a second collective control stick, the second two-position throttle switch being movable between a Fly position and an Idle position; and
controlling the engine as a function of the positions of the first two-position throttle switch and the second two-position throttle switch;
wherein when the first two-position throttle switch is set to the Fly position and the second two-position throttle switch is set to the Fly position, the FADEC device commands the engine to operate in a Fly regime; and
wherein at least one of (1) when the first two-position switch is in the Fly position and the second two-position switch is in the Idle position, the FADEC device commands the engine to operate in a fly regime and subsequent switching the first two-position switch to the Idle position initiates autorotation of the helicopter and (2) when the first two-position switch is in the Idle position and the second two-position switch is in the Fly position, the FADEC device commands the engine to operate in a fly regime and subsequent switching the second two-position switch to the Idle position initiates autorotation of the helicopter.

14. The method of claim 13, wherein when the first two-position switch is in the Idle position and the second two-position switch is in the Idle position, the FADEC device commands the engine to operate in an idle regime.

15. The method of claim 13, wherein when the first two-position switch is in the Fly position and the second two-position switch is in the Fly position, the FADEC device commands the engine to operate in a fly regime and a dual fly crew alerting system caution message is provided to indicate that autorotation can be accomplished by switching both the first two-position switch and the second two-position switch to their Idle positions.

* * * * *